(12) United States Patent
Asano

(10) Patent No.: US 9,705,391 B2
(45) Date of Patent: Jul. 11, 2017

(54) STEPPING MOTOR, LENS APPARATUS, AND IMAGE PICKUP APPARATUS

(71) Applicant: CANON KABUSHIKI KAISHA, Tokyo (JP)

(72) Inventor: Kota Asano, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 288 days.

(21) Appl. No.: 13/919,198

(22) Filed: Jun. 17, 2013

(65) Prior Publication Data

US 2013/0334908 A1  Dec. 19, 2013

(30) Foreign Application Priority Data

Jun. 19, 2012  (JP) ................................ 2012-138249

(51) Int. Cl.
*H02K 37/14* (2006.01)
*H02K 5/167* (2006.01)
*H02K 7/09* (2006.01)

(52) U.S. Cl.
CPC ........... *H02K 37/14* (2013.01); *H02K 5/1672* (2013.01); *H02K 7/09* (2013.01)

(58) Field of Classification Search
CPC ........ H02K 5/1672; H02K 37/14; H02K 7/09; H02K 5/1675
USPC ...................... 310/67 R, 71, 90, 49, 51, 90.5
See application file for complete search history.

(56) References Cited

U.S. PATENT DOCUMENTS

| 5,412,266 | A | 5/1995 | Okazaki et al. | |
| 7,449,805 | B2 * | 11/2008 | Bin | H02K 1/145 310/257 |
| 7,667,361 | B2 | 2/2010 | Nobe et al. | |
| 2005/0057105 | A1 * | 3/2005 | Kasahara | H02K 37/14 310/257 |

(Continued)

FOREIGN PATENT DOCUMENTS

| CN | 1078074 A | 11/1993 |
| CN | 202153704 U | 2/2012 |

(Continued)

OTHER PUBLICATIONS

Machine translation for JPH06284678.*

(Continued)

*Primary Examiner* — Hanh Nguyen
*Assistant Examiner* — Ahmed Elnakib
(74) *Attorney, Agent, or Firm* — Rossi, Kimms & McDowell LLP

(57) ABSTRACT

A stepping motor includes a rotor having a rotor magnet fixed to a rotating shaft, a plurality of coil bobbins where coils are wound, a stator yoke group having a plurality of stator yokes each of which surrounds each of the plurality of coil bobbins in an axial direction and a radial direction of the rotating shaft, and the plurality of stator yokes each having pole teeth alternately arranged in a circumferential direction around the rotating shaft so as to be opposed to a side surface of the rotor magnet, and a magnetic attractive force generating member configured to attract the rotor magnet to the axial direction of the rotating shaft by a magnetic attractive force, and a magnetic center of the rotor magnet and a magnetic center of the stator yoke group coincide with each other.

11 Claims, 6 Drawing Sheets

(56) References Cited

U.S. PATENT DOCUMENTS

| | | | | |
|---|---|---|---|---|
| 2007/0001531 A1* | 1/2007 | Nagai | ............... | H02K 7/09 |
| | | | | 310/156.04 |
| 2007/0296294 A1* | 12/2007 | Nobe | ............... | F16C 35/02 |
| | | | | 310/90 |
| 2008/0197739 A1* | 8/2008 | Nashiki | ............... | H02K 1/06 |
| | | | | 310/156.55 |
| 2009/0026855 A1 | 1/2009 | Kasai | | |

FOREIGN PATENT DOCUMENTS

| | | |
|---|---|---|
| JP | 06-284678 A | 10/1994 |
| JP | H06284678 * | 10/1994 |
| JP | 08-149780 A | 6/1996 |
| JP | 10146014 A | 5/1998 |
| JP | 3393020 B2 | 1/2003 |
| JP | 2008005640 A | 1/2008 |
| JP | 2009050149 A | 3/2009 |
| JP | 2009-136089 A | 6/2009 |
| JP | 2012-075231 A | 4/2012 |

OTHER PUBLICATIONS

English translation of JP 06-284678; Japan; Oct. 1994; Kobayashi Ykihiro.*
English translation for JPH09154271; Ueno et al.; Jun. 1997; Japan.*
Office Action issued in Chinese Appln No. 201310234129.4 dated Jun. 1, 2015. English translation provided.
Office Action issued in Chinese Appln. No. 201310234129.4 mailed Jul. 20, 2016. English translation provided.
Office Action issued in Japanese Appln. No. 2012-138249 mailed Mar. 22, 2016. English translation provided.

* cited by examiner

STEPPING MOTOR, LENS APPARATUS, AND IMAGE PICKUP APPARATUS

BACKGROUND OF THE INVENTION

Field of the Invention

The present invention relates to a stepping motor.

Description of the Related Art

A stepping motor is used as a drive source of a movable member of various kinds of apparatuses, and it is especially used as a drive source of an optical adjusting member such as a lens that requires position control accuracy. Recently, according to a design which reduces a size of a camera or a lens, a small-size stepping motor that further increases space efficiency and that has high-drive torque characteristics is required. In the stepping motor, silent characteristics that are appropriate for taking a moving picture of the camera, as well as the improvements of drive torque characteristics, are also required. Therefore, various kinds of proposals to reduce a noise of the stepping motor itself are made.

Japanese Patent Laid-Open No. H8-149780 discloses a stepping motor in which one of both ends of bearings is extended to abut against a rotor magnet so as to displace an abutment surface of coil bobbins from a center surface of the rotor magnet in an axial direction by a required amount. In the stepping motor of Japanese Patent Laid-Open No. H8-149780, magnetic centers of the rotor magnet and the coil bobbin are previously displaced from each other by the required amount. Therefore, even when a magnetic balance between the rotor magnet and the coil bobbin is lost in accordance with an individual difference of parts, the displacement of the rotor in the axial direction is prevented. Therefore, a hitting sound that is generated by the rotor magnet and the bearing can be decreased.

However, in the stepping motor of Japanese Patent Laid-Open No. H8-149780, in order to prevent the displacement of the rotor in the axial direction due to losing the magnetic balance between the rotor magnet and the coil bobbin, the magnetic centers of the rotor magnet and the coil bobbin are displaced. Therefore, compared to a case where magnetic centers of the rotor magnet and the coil bobbin are coincident with each other, the drive torque of the motor is reduced. On the other hand, in order to ensure a desired drive torque in a configuration of Japanese Patent Laid-Open No. H8-149780, a total length of the motor needs to be extended by an amount of compensation for the reduction of an opposed area of the rotor magnet and the coil bobbin caused by extending the bearing, and thus the size of the stepping motor is increased.

BRIEF SUMMARY OF THE INVENTION

The present invention provides a silent stepping motor that reduces a hitting sound generated by a rotor magnet and a bearing while keeping characteristics of a drive torque. The present invention also provides a lens apparatus and an image pickup apparatus that include the stepping motor.

A stepping motor as one aspect of the present invention includes a rotor having a rotor magnet fixed to a rotating shaft, a plurality of coil bobbins where coils are wound, a stator yoke group having a plurality of stator yokes each of which surrounds each of the plurality of coil bobbins in an axial direction and a radial direction of the rotating shaft, and the plurality of stator yokes each having pole teeth alternately arranged in a circumferential direction around the rotating shaft so as to be opposed to, i.e. face, a side surface of the rotor magnet, and a magnetic attractive force generating member configured to attract the rotor magnet to the axial direction of the rotating shaft by a magnetic attractive force, and a magnetic center of the rotor magnet and a magnetic center of the stator yoke group coincide with each other.

A lens apparatus as another aspect of the present invention includes the stepping motor.

An image pickup apparatus as another aspect of the present invention includes the stepping motor.

Further features and aspects of the present invention will become apparent from the following description of exemplary embodiments with reference to the attached drawings.

DETAILED DESCRIPTION OF THE PREFERRED EMBODIMENTS

Figure 1:
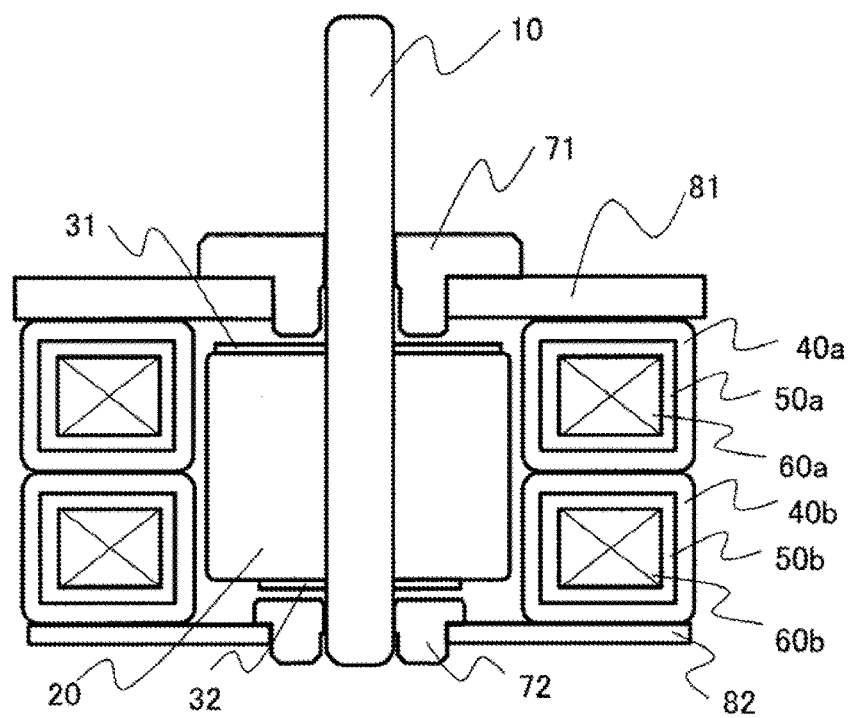
FIG. 1 is a cross-sectional diagram of a stepping motor as a comparative example.

Exemplary embodiments of the present invention will be described below with reference to the accompanied drawings. In each of the drawings, the same elements will be denoted by the same reference numerals and the duplicate descriptions thereof will be omitted.

First of all, referring to FIG. 1, a stepping motor as a comparative example to be compared with the present invention will be described. FIG. 1 is a cross-sectional diagram of the stepping motor (a two-phase PM stepping motor) as the comparative example.

In FIG. 1, reference numeral 10 denotes a rotating shaft. Reference numeral 20 denotes a rotor magnet, which is fixed to the rotating shaft 10. Reference numerals 31 and 32 denote thrust washers, which are provided on both ends of the rotor magnet 20 so that the rotor magnet 20 is held to be fixed between both sides in an axial direction of the rotating shaft 10. The rotating shaft 10, the rotor magnet 20, and the thrust washers 31 and 32 constitute a rotor of the stepping motor. These members constituting the rotor integrally rotate when the stepping motor is excited.

Reference numeral 40a denotes an A-phase stator yoke, and reference numeral 40b denotes a B-phase stator yoke (collectively, referred to as a "stator yoke group"). The stator yoke group includes a plurality of stator yokes each of which surrounds each of a plurality of coil bobbins in the axial direction and a radial direction of the rotating shaft 10, and each of the plurality of stator yoke has pole teeth alternately arranged in a circumferential direction around the rotating shaft 10 so that the pole teeth are opposed to, i.e. face, a side surface of the rotor magnet 20. Each of the A-phase stator yoke 40a and the B-phase stator yoke 40b includes a stator, i.e. the pole teeth (not shown) that are alternately arranged in the circumferential direction of the rotor magnet 20 so as to be opposed to, i.e. face, the side surface of the rotor magnet 20 (a side surface of an outside diameter of a cylinder). Each of the A-phase stator yoke 40a and the B-phase stator yoke 40b also includes a yoke that forms an outer shape of the stepping motor. The A-phase stator yoke 40a and the B-phase stator yoke 40b are laminated double in the axial direction of the rotating shaft 10, and they are fixed by welding or the like.

Reference numeral 50a denotes an A-phase coil bobbin, and reference numeral 50b denotes a B-phase coil bobbin (collectively, referred to as a "coil bobbin"). The A-phase coil bobbin 50a and the B-phase coil bobbin 50b are surrounded in the axial direction and the radial direction (a direction orthogonal to both the axial direction and the circumferential direction) by the A-phase stator yoke 40a and the B-phase stator yoke 40b, respectively. An A-phase coil 60a and a B-phase coil 60b (collectively, referred to as a "coil") are wound around the A-phase coil bobbin 50a and the B-phase coil bobbin 50b, respectively. A terminal for excitation for the coil is omitted.

Reference numeral 71 denotes a bearing (a first bearing), which is fixed to a case plate 81 (a flange plate). Reference numeral 72 denotes a bearing (a second bearing), which is fixed to a case plate 82. The case plates 81 and 82 hold the A-phase stator yoke 40a and the B-phase stator yoke 40b that are laminated double to be fixed on both sides in the axial direction of the rotting shaft 10 using by welding or the like. In other words, the case plates 81 and 82 hold the bearings 71 and 72 respectively, and also hold the A-phase stator yoke 40a and the B-phase stator yoke 40b on both sides in the axial direction. Thus, the rotor is arranged so as to be held between the case plates 81 and 82. According to this arrangement, the bearings 71 and 72 support the rotating shaft 10 (both ends in the axial direction of the rotating shaft 10) in the radial direction. In order to prevent interference between the bearings 71 and 72 and the rotor magnet 20 in exciting the stepping motor to rotate the rotor, the thrust washers 31 and 32 are disposed between the bearings 71 and 72 and the rotor magnet 20, respectively. As a result, a movement of the rotor magnet 20 in the axial direction (a thrust direction) is restricted.

Figure 2:
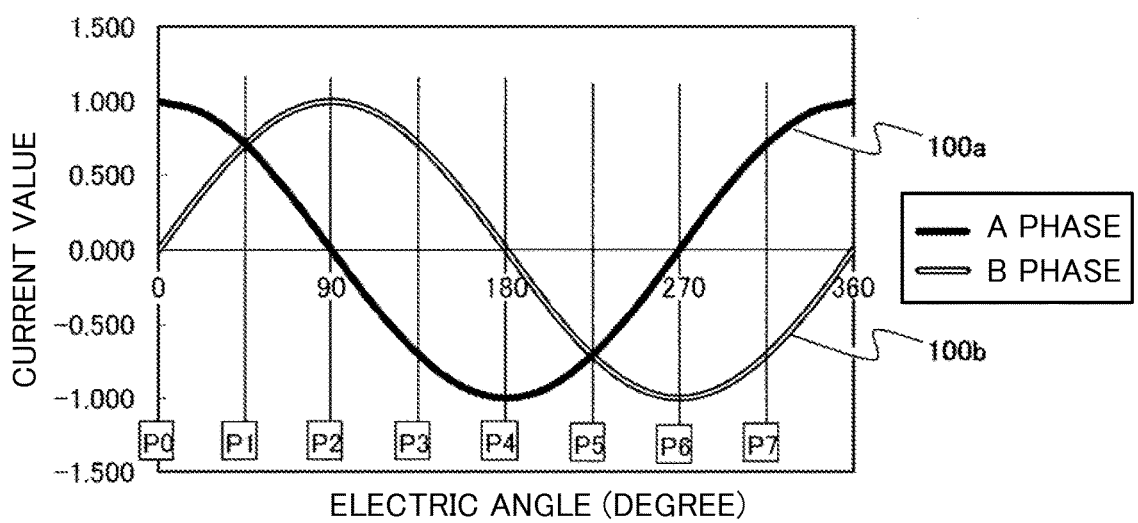
FIG. 2 is a diagram of describing a waveform of a drive current of the stepping motor.

Next, referring to FIGS. 2, and 3A to 3D, an operating principle of the stepping motor (the two-phase PM stepping motor) will be described. FIG. 2 is a diagram of a waveform of drive current of the stepping motor, and a lateral axis indicates an electric angle and a vertical axis indicates a current value. In FIG. 2, reference numeral 100a denotes a cosine waveform of the drive current which excites the A-phase coil 60a, and reference numeral 100b denotes a sine waveform of the drive current which excites the B-phase coil 60b. FIGS. 3A to 3D are schematic diagrams of illustrating position relations between the rotor magnet 20 of the stepping motor and the pole teeth of the A-phase stator yoke 40a and the B-phase stator yoke 40b that generate magnetic poles by supplying current to the A-phase coil 60a and the B-phase coil 60b.

In the two-phase PM stepping motor, the rotor magnet 20 is configured so that north poles and south poles in a total of twenty poles (eight poles in FIGS. 3A to 3D) are alternately magnetized. For example, when the stepping motor is driven by 1-2 phase driving method, a rotating angle per one step is 4.5 degrees. The A-phase stator yoke 40a and the B-phase stator yoke 40b are arranged so as to encompass the side surface (the outer periphery) of the rotor magnet 20 and so as to shift a phase by around 90 degrees when the same shape corresponds to one period. When the current is supplied to each phase of excitation coils, the magnetic poles are generated in the A-phase stator yoke 40a and the B-phase stator yoke 40b so as to attract to the magnetic pole of the rotor magnet 20, and the rotor magnet 20 stops at an angle at which magnetic forces are balanced.

Figure 3A:
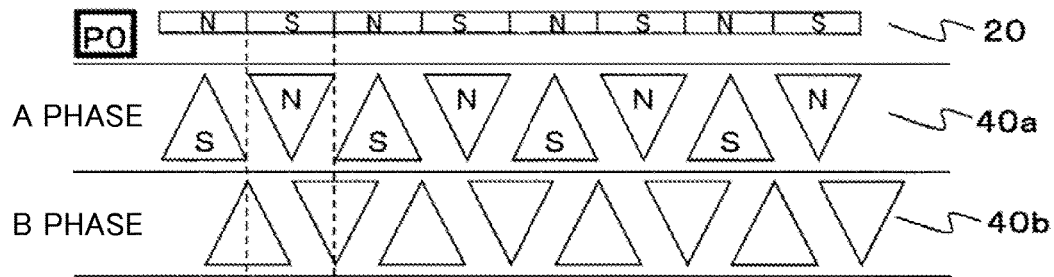
FIGS. 3A to 3D are schematic diagrams of illustrating a position relation between a rotor magnet and pole teeth of a stator yoke in the stepping motor.
Figure 3B:
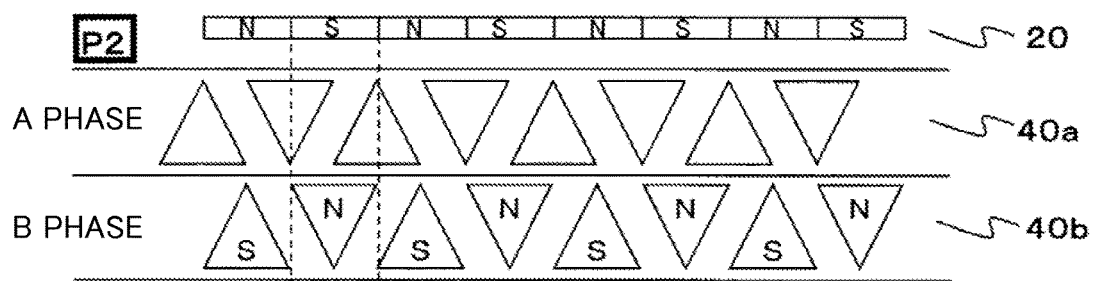
Figure 3C:
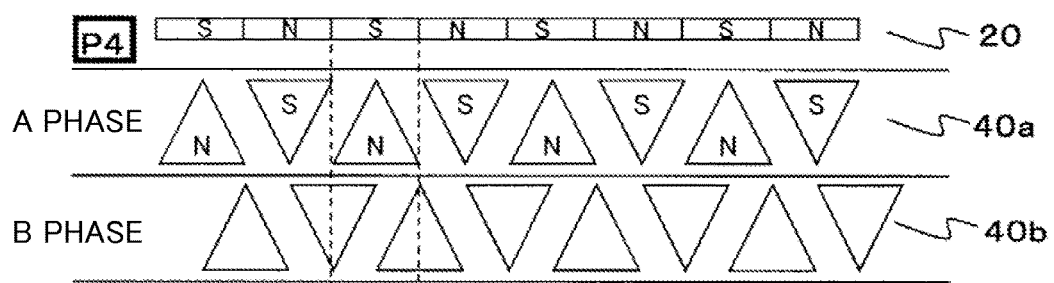
Figure 3D:
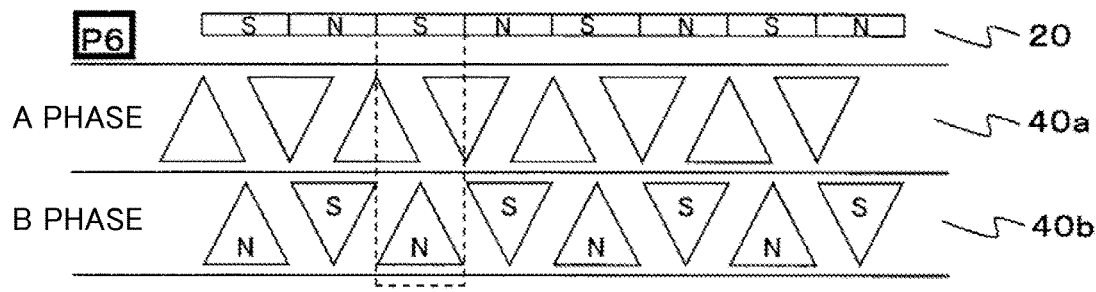

FIG. 3A illustrates a position relation between the rotor magnet 20 and the A-phase stator yoke 40a and the B-phase stator yoke 40b when the electric angle is P0 in an excited state of FIG. 2. FIG. 3B illustrates a position relation between the rotor magnet 20 and the A-phase stator yoke 40a and the B-phase stator yoke 40b when the electric angle is P2 in the excited state of FIG. 2. FIG. 3C illustrates a position relation between the rotor magnet 20 and the A-phase stator yoke 40a and the B-phase stator yoke 40b when the electric angle is P4 in the excited state of FIG. 2. FIG. 3D illustrates a position relation between the rotor magnet 20 and the A-phase stator yoke 40a and the B-phase stator yoke 40b when the electric angle is P6 in the excited state of FIG. 2. Thus, when the current is excited to each of the two-phase excitation coils, the rotor magnet 20 as a rotor rotates, i.e. the stepping motor is rotatably driven.

Figure 4A:
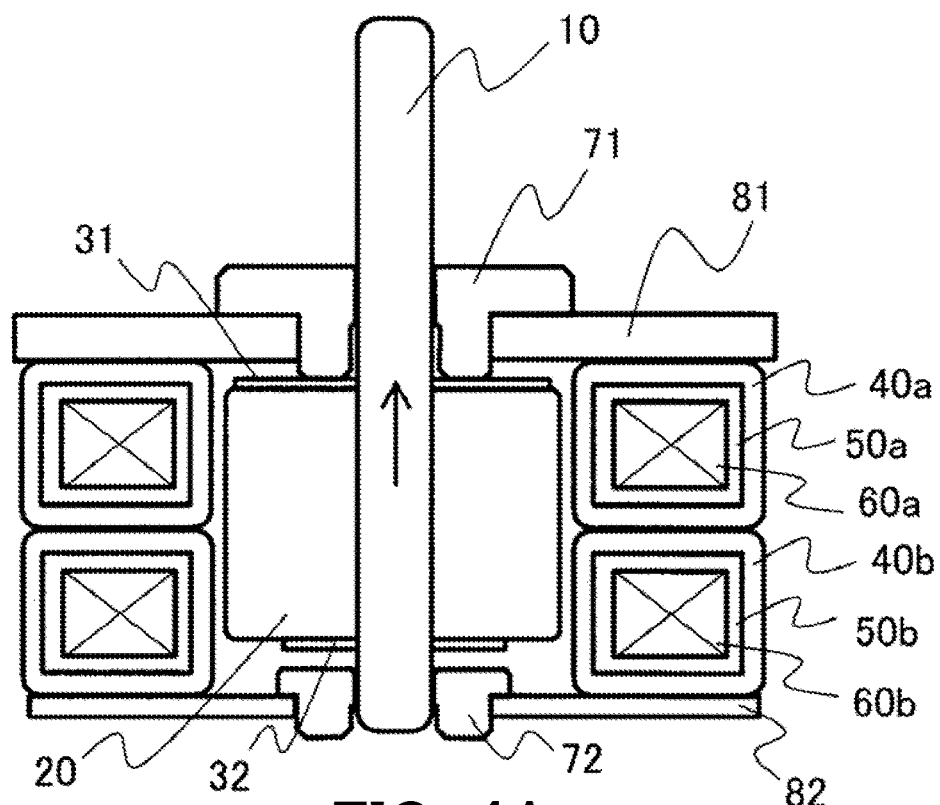
FIGS. 4A and 4B are cross-sectional diagrams of illustrating an operation of the stepping motor as the comparative example.

Next, referring to FIGS. 4A and 4B, an operation of the rotating shaft 10 in the axial direction when the stepping motor is excited will be described. FIG. 4A is a cross-sectional diagram of the stepping motor in a state where the A-phase stator yoke 40a is only excited when the electric angle of FIG. 2 is P0 or P4. Since the B-phase stator yoke 40b is not excited in this case, the magnetic force is not generated for the B-phase stator yoke 40b. Therefore, a magnetic center (a center in the axial direction) of the rotor magnet 20 and a magnetic center (a center in the axial direction) of the A-phase stator yoke 40a are attracted to each other, and thus the bearing 71 abuts against the thrust washer 31.

Figure 4B:
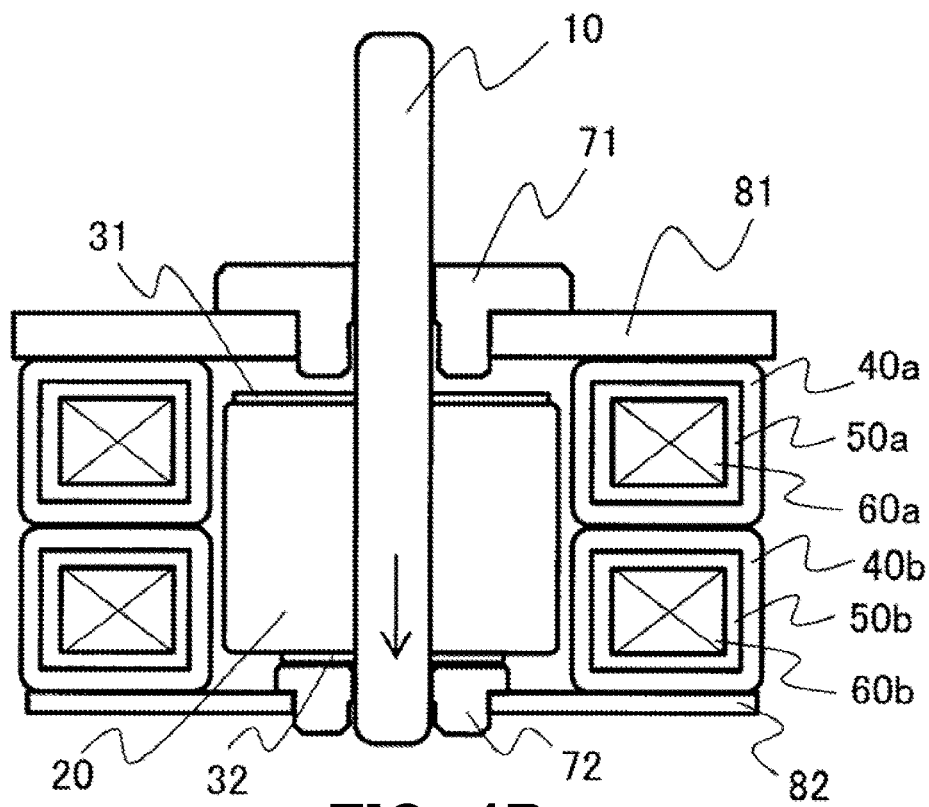

On the other hand, FIG. 4B is a cross-sectional diagram of the stepping motor in a state where the B-phase stator yoke 40b is only excited when the electric angle of FIG. 2 is P2 or P6. Since the A-phase stator yoke 40a is not excited in this case, the magnetic force is not generated for the A-phase stator yoke 40a. Therefore, the magnetic center (the center in the axial direction) of the rotor magnet 20 and the magnetic center (the center in the axial direction) of the B-phase stator yoke 40b are attracted to each other, and thus the bearing 72 abuts against the thrust washer 32.

Since the stepping motor operates by the A-phase current and the B-phase current (the drive current) illustrated in FIG. 2, the excited states of FIGS. 4A and 4B are repeated. As a result, the hit (the collision) of the bearing 71 and the thrust washer 31 and the hit (the collision) of the bearing 72 and the thrust washer 32 are repeated, and the hitting sound is generated by these hits. Since this hitting sound is recognized by a user as an unintended abnormal noise in taking a moving picture using an image pickup apparatus (a camera) or the like, the quality of the camera may be disturbed. In the present embodiment, a stepping motor, a lens apparatus, and an image pickup apparatus which reduce the hit are provided. A specific configuration will be described in the following Embodiments 1 to 3.

Embodiment 1

Figure 5:
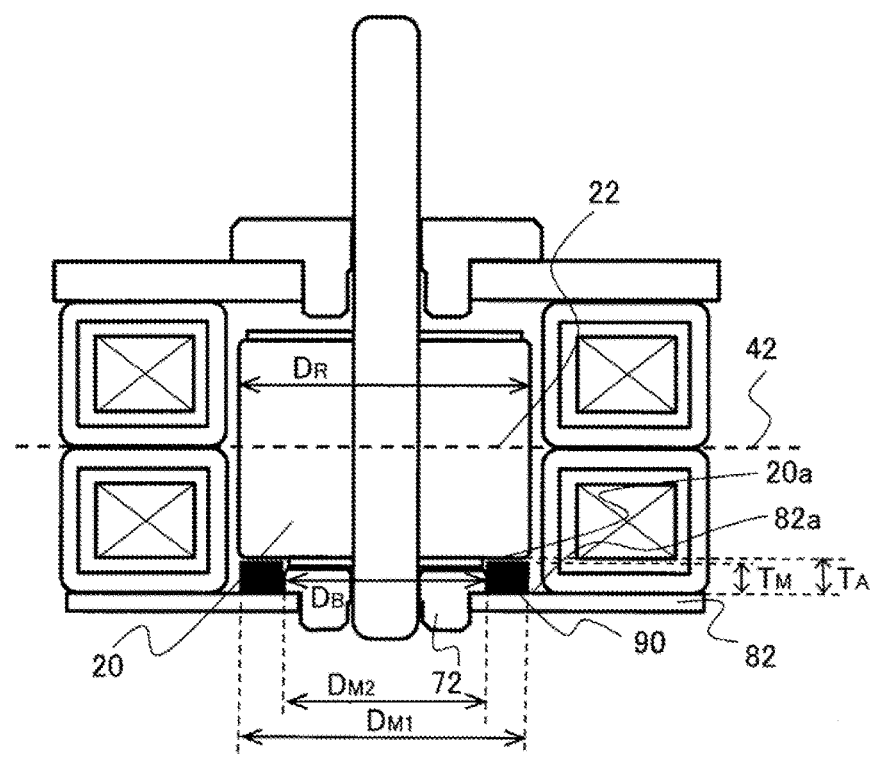
FIG. 5 is a cross-sectional diagram of a stepping motor in Embodiment 1.

First of all, referring to FIG. 5, a stepping motor in Embodiment 1 of the present invention will be described. FIG. 5 is a cross-sectional diagram of the stepping motor in the present embodiment.

A basic configuration of the stepping motor in the present embodiment is the same as that of the stepping motor as the comparative example that is described with reference to FIG. 1. Therefore, reference numerals necessary for descriptions are only indicated in FIG. 5, and other reference numerals are omitted. In the stepping motor of the present embodiment, reference numeral 90 denotes a magnetic washer (SUS: Steel Use Stainless) as a magnetic attractive force generating member that is made of a magnetic material. The magnetic washer 90 is provided to reduce the hitting sound that is generated when a rotary drive is performed for the stepping motor as the comparative example. The magnetic washer 90 is fixed to the case plate 82 by the welding or the like.

The magnetic washer 90 of the present embodiment has a doughnut shape with an outside diameter $D_{M1}$ and an inside diameter $D_{M2}$. It is preferred that the inside diameter $D_{M2}$ of the magnetic washer 90 is set to be not less than an outside diameter $D_B$ of the bearing 72, i.e. the inside diameter $D_{M2}$ of the magnetic washer 90 and the outside diameter $D_B$ of the bearing 72 are set to satisfy a relation of $D_{M2} \geq D_B$. It is more preferred that the outside diameter $D_{M2}$ of the magnetic washer 90 is set to be not more than an outside diameter $D_R$ of the rotor magnet 20, i.e. the outside diameter $D_{M1}$ of the magnetic washer 90 and the outside diameter $D_R$ of the rotor magnet 20 are set to satisfy a relation of $D_R \geq D_{M1}$. Setting the diameters so as to satisfy the relations, a size of the stepping motor can be reduced.

In addition, a thickness $T_M$ of the magnetic washer 90 in the axial direction and a distance $T_A$ between a one-side end surface 20a of the rotor magnet 20 in the axial direction and a one-side end surface 82a of the case plate 82 are set so as to satisfy a relation of $T_M \leq T_A$. Setting the thickness and the distance so as to satisfy the relation, interference between the rotor magnet 20 and the magnetic washer 90 can be prevented when the rotor magnet 20 is rotated by the excitation.

Subsequently, a mechanism where the magnetic washer 90 functions as the magnetic attractive force generating member will be described. First of all, the magnetization for the rotor magnet 20 of the stepping motor in the present embodiment is performed for a bottom surface (the one-side end surface 20a of the rotor magnet 20) that is opposed to the magnetic washer 90, as well as a side surface that is opposed to each excitation stator. Therefore, a certain magnetic flux density also exists on the bottom surface of the rotor magnet 20. In other words, arranging the magnetic washer 90 so as to be opposed to the bottom surface of the rotor magnet 20, a magnetic attractive force is generated between the rotor magnet 20 and the magnetic washer 90. According to this configuration, the magnetic washer 90 can attract the rotor magnet 20 in the axial direction by the magnetic attractive force. For example, when the excitation is performed only for the A phase or the B phase in the stepping motor as the comparative example, the magnetic force acting in the axial direction of the rotating shaft 10 with respect to the rotor magnet 20 is 1.1 gf at a maximum. On the other hand, in the stepping motor of the present embodiment, the magnetic attractive force of the magnetic washer 90 is set to exceed 1.1 gf.

According to the above configurations, even when the magnetic force is generated in the axial direction of the rotating shaft 10 with respect to the rotor magnet 20 in a state where the A phase or the B phase is only excited, the magnetic washer 90 attracts by a magnetic force not less than the magnetic force (the magnetic attractive force) applied to the rotor magnet 20. Therefore, during a rotary drive of the stepping motor, the rotor magnet 20 is always attracted to the side of the bearing 72, and a state where the thrust washer 32 and the bearing 72 abut against each other is maintained. Accordingly, the hit of the bearing 71 and the thrust washer 31 and the hit of the bearing 72 and the thrust washer 32 are decreased, and as a result, the generation of the hitting sound can be reduced.

In the stepping motor of the present embodiment, a center surface 22 of the rotor magnet 20 in an axial direction 10 and a center surface of the stator yoke group (the A-phase stator yoke 40a and the B-phase stator yoke 40b) coincide with each other. The words "coincide with each other" mean a case where they are estimated to substantially coincide with each other, i.e. nearly coincide with each other, as well as a case where they exactly coincide with each other. In other words, in the stepping motor of the present embodiment, magnetic centers of the rotor magnet 20 and the stator yoke group coincide with each other. The magnetic center of the rotor magnet 20 is a center surface 22 of the rotor magnet 20 in the axial direction. The magnetic center of the stator yoke group is an abutment surface 42 (a center surface of the stator yoke group) of the A-phase stator yoke 40a and the B-phase stator yoke 40b, which means a magnetic center in a state where the current is supplied to each of the phase coils 60a and 60b at the same time. The words "magnetic centers coincide with each other" mean a case where they are estimated to substantially coincide with each other, i.e. nearly coincide with each other, as well as a case where they exactly coincide with each other. In the present embodiment, the stator yoke group has a double laminated configuration of the A-phase stator yoke 40a and the B-phase stator yoke 40b (i.e. two stator yokes are laminated), but the embodiment is not limited to this and it only needs to have multiple laminated configurations (i.e. multiple stator yokes are laminated). For example, when it has a triple laminated configuration (i.e. three stator yokes are laminated), the magnetic center of the stator yoke group corresponds to the center surface of the stator yoke located at a center of the triple laminated configuration (a second stator yoke of the three stator yokes).

In the stepping motor of the present embodiment, the magnetic washer 90 is arranged with appropriate space efficiency without decreasing an opposed area of the rotor magnet 20 and each phase stator (the stator yoke). Therefore, even when the magnetic washer 90 is provided to take a noise reduction measurement, preferred drive torque characteristics can be maintained. Additionally, in the stepping motor of the present embodiment, since the space efficiency is considered without increasing an outer shape of the stepping motor, a size of the stepping motor can be reduced. In the present embodiment, the magnetic washer 90 is disposed at a side of the bearing 72 (at a side of the case plate 82), but the embodiment is not limited to this. Alternatively, the magnetic washer 90 may be disposed at a side of the bearing 71 (at a side of the case plate 81).

Embodiment 2

Figure 6:
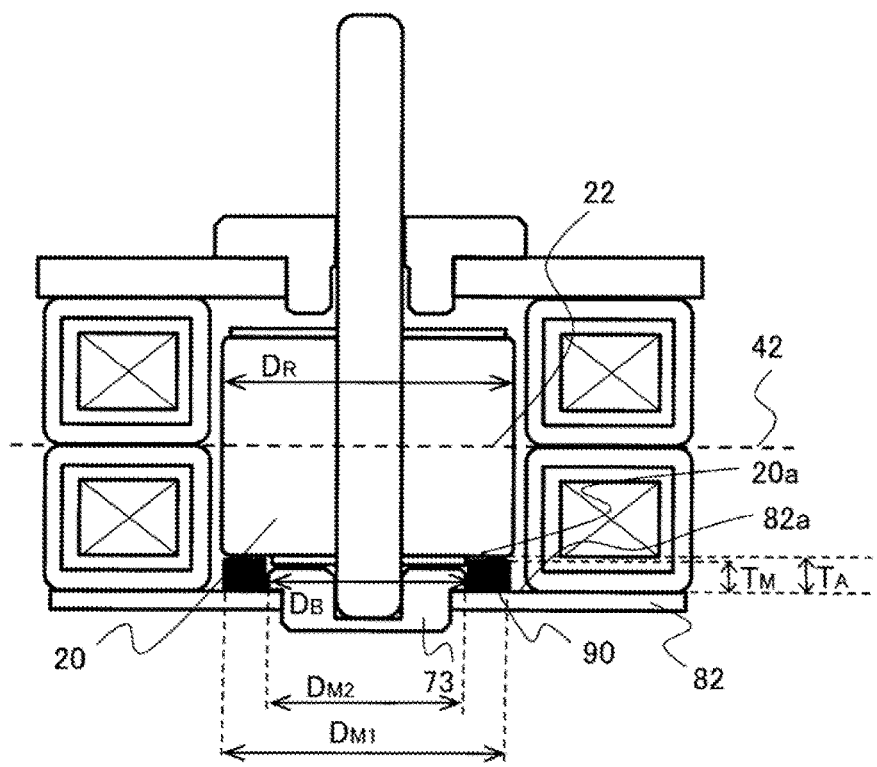
FIG. 6 is a cross-sectional diagram of a stepping motor in Embodiment 2.

Next, referring to FIG. 6, a stepping motor in Embodiment 2 of the present invention will be described. FIG. 6 is a cross-sectional diagram of the stepping motor in the present embodiment. The stepping motor of the present embodiment is different from the stepping motor of Embodiment 1 in that a bearing 73 that has an axial direction receiving shape (a thrust receiving shape) of one end (a bottom end) of the rotating shaft 10 is provided, instead of the bearing 72 of Embodiment 1. Other configurations are the same as those of Embodiment 1 described with reference to FIG. 5, and therefore descriptions of the configurations will be omitted.

Thus, using the bearing 73 that has the axial direction receiving shape of the rotating shaft 10, an air gap between the rotor magnet 20 and the magnetic washer 90 can be set more precisely. Therefore, the magnetic attractive force which is necessary for the magnetic washer 90 can be decreased. As a result, since a size of the magnetic washer 90 can be reduced, the size of the stepping motor can be reduced. Additionally, with respect to a shape of an abutment portion of the rotating shaft 10 against the bearing 73, a contact area is decreased and a drive loss is reduced, and therefore an R shape at a tip can be freely set.

In the present embodiment, similarly to Embodiment 1, it is preferred that the inside diameter $D_{M2}$ of the magnetic washer 90 is set to be not less than an outside diameter $D_B$ of the bearing 73, i.e. the inside diameter $D_{M2}$ of the magnetic washer 90 and the outside diameter $D_B$ of the bearing 73 are set to satisfy the relation of $D_{M2} \geq D_B$. It is more preferred that the outside diameter $D_{M1}$ of the magnetic washer 90 is set to be not more than the outside diameter $D_R$ of the rotor magnet 20, i.e. the outside diameter $D_{M1}$ of the magnetic washer 90 and the outside diameter $D_R$ of the rotor magnet 20 are set to satisfy the relation of $D_R \geq D_{M1}$. In addition, it is preferred that the thickness $T_M$ of the magnetic washer 90 in the axial direction and the distance $T_A$ between the one-side end surface 20a of the rotor magnet 20 in the axial direction and the one-side end surface 82a of the case plate 82 are set so as to satisfy the relation of $T_M \leq T_A$.

Embodiment 3

Figure 7:
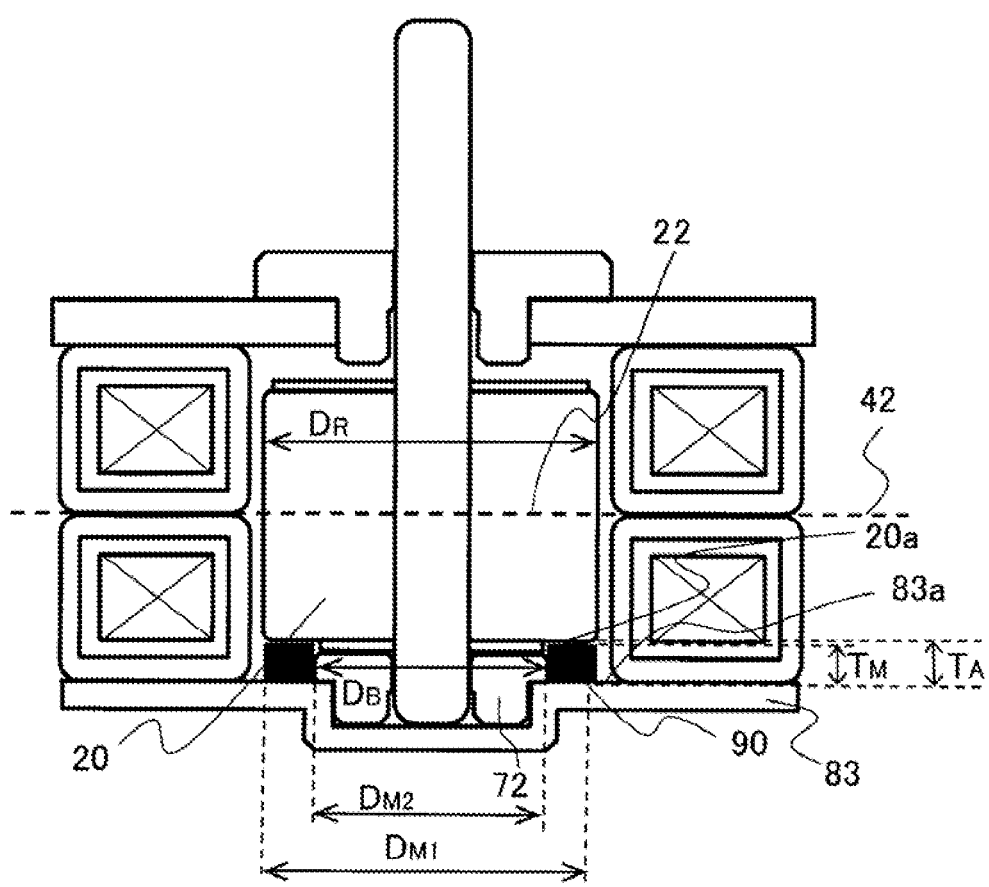
FIG. 7 is a cross-sectional diagram of a stepping motor in Embodiment 3.

Next, referring to FIG. 7, a stepping motor in Embodiment 3 of the present invention will be described. FIG. 7 is a cross-sectional diagram of the stepping motor in the present embodiment. The stepping motor of the present embodiment is different from the stepping motor of Embodiment 1 in that a case plate 83 that has an axial direction receiving shape (a thrust receiving shape) of one end of the rotating shaft 10 is provided, instead of the case plate 82 of Embodiment 1. Other configurations are the same as those of Embodiment 1 described with reference to FIG. 5, and therefore descriptions of the configurations will be omitted.

Thus, using the case plate 83 that has the axial direction receiving shape of the rotating shaft 10, the air gap between the rotor magnet 20 and the magnetic washer 90 can be set more precisely. Therefore, the magnetic attractive force which is necessary for the magnetic washer 90 can be decreased. As a result, since the size of the magnetic washer 90 can be reduced, the size of the stepping motor can be reduced. Additionally, with respect to a shape of an abutment portion of the rotating shaft 10 against the case plate 83, a contact area is decreased and a drive loss is reduced, and therefore an R shape at a tip can be freely set.

In the present embodiment, similarly to Embodiment 1, it is preferred that the inside diameter $D_{M2}$ of the magnetic washer 90 is set to be not less than the outside diameter $D_B$ of the bearing 72, i.e. the inside diameter $D_{M2}$ of the magnetic washer 90 and the outside diameter $D_B$ of the bearing 72 are set to satisfy the relation of $D_{M2} \geq D_B$. It is more preferred that the outside diameter $D_{M1}$ of the magnetic washer 90 is set to be not more than the outside diameter $D_R$ of the rotor magnet 20, i.e. the outside diameter $D_{M1}$ of the magnetic washer 90 and the outside diameter $D_R$ of the rotor magnet 20 are set to satisfy the relation of $D_R \geq D_{M1}$. In addition, it is preferred that the thickness $T_M$ of the magnetic washer 90 in the axial direction and the distance $T_A$ between the one-side end surface 20a of the rotor magnet 20 in the axial direction and a one-side end surface 83a of the case plate 83 are set so as to satisfy the relation of $T_M \leq T_A$.

Figure 8:
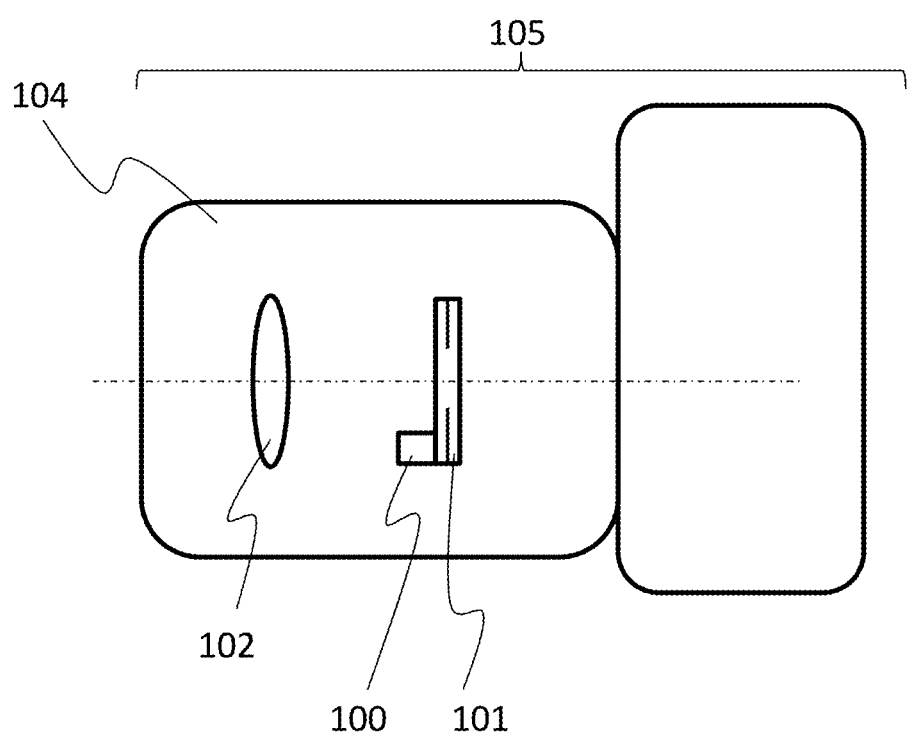
FIG. 8 schematically illustrates an image pickup apparatus.

According to each embodiment described above, a silent stepping motor that reduces the hitting sound of a rotor magnet and a bearing while keeping drive torque characteristics can be provided. Additionally, the stepping motor is appropriate for space efficiency, and therefore a size of the stepping motor can be reduced. Furthermore, according to each embodiment described above, a lens apparatus 104 and an image pickup apparatus 105 that include the stepping motor 100 can be provided as shown in FIG. 8. For example, in the lens apparatus 104 comprising a plurality of lens unit 102, the stepping motor 100 of each embodiment is used to drive an aperture stop 101.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, instead of the magnetic washer 90 and the bearing 72 (the bearing 73), even when a bearing made of a magnetic material extending in the radial direction is used as the magnetic attractive force generating member, the same effect as that of each of embodiments described above can be obtained. Additionally, instead of the magnetic washer 90 and the case plate 82 (the case plate 83), even when a case plate which is integrally configured by these two parts made of a magnetic material is used as the magnetic attractive force generating member, the same effect as that of each of embodiments described above can be obtained. The outside diameter $D_{M1}$ of the magnetic washer 90 and the outside diameter $D_R$ of the rotor magnet 20 may also be set to satisfy the relation of $D_R < D_{M1}$, i.e. the magnetic washer 90 may also be held between the B-phase stator yoke 40b and the case plate 82.

This application claims the benefit of Japanese Patent Application No. 2012-138249, filed on Jun. 19, 2012, which is hereby incorporated by reference herein in its entirety.

What is claimed is:

1. A stepping motor comprising:
a rotating shaft;
a rotor magnet fixed to the rotating shaft;
a plurality of coil bobbins each wound with a coil;
a stator yoke group having a plurality of stator yokes each surrounding each of the plurality of coil bobbins in an axial direction and a radial direction of the rotating shaft, the plurality of stator yokes each having pole teeth alternately arranged in a circumferential direction around the rotating shaft and disposed opposed to a side surface of the rotor magnet;
a first bearing supporting the rotating shaft and disposed on an output side of the stepping motor;
a second bearing supporting the rotating shaft and disposed on an opposite side to the output side of the stepping motor;
a magnetic member configured to attract the rotor magnet in the axial direction of the rotating shaft to a side of the second bearing;
a first case plate fixing the first bearing;
a second case plate fixing the second bearing;
a washer disposed between the rotor magnet and the second bearing; and an output washer disposed between the rotor magnet and the first bearing, wherein the first and second case plates hold the stator yoke group between both sides thereof in the axial direction, wherein the magnetic member has an annular shape, wherein a thickness TM of the magnetic member in the axial direction is less than a distance TA between a one-side end surface of the second case plate and a one-side end surface of the rotor magnet so that the magnetic member does not contact the rotor magnet, wherein the washer contacts the rotor magnet and the second bearing, and wherein the output side washer does not contact the first bearing.

2. The stepping motor according to claim 1, wherein:

a magnetic center of the rotor magnet and a magnetic center of the stator yoke group coincide with each other, the magnetic center of the rotor magnet is a center surface of the rotor magnet in the axial direction, and the magnetic center of the stator yoke group is a center surface of the stator yoke group in the axial direction.

3. The stepping motor according to claim 1, wherein an inside diameter DM2 of the magnetic member and an outside diameter DB of the second bearing are set to satisfy a relation of DM2≥DB.

4. The stepping motor according to claim 1, wherein an outside diameter DM1 of the magnetic member and an outside diameter DR of the rotor magnet are set to satisfy a relation of DR≥DM1.

5. The stepping motor according to claim 3, wherein the second bearing has an axial direction receiving shape of one end of the rotating shaft.

6. The stepping motor according to claim 3, wherein the second case plate has an axial direction receiving shape of one end of the rotating shaft.

7. A lens apparatus comprising:

a lens; and a stepping motor comprising:
 a rotating shaft;
 a rotor magnet fixed to the rotating shaft;
 a plurality of coil bobbins each wound with a coil;
 a stator yoke group having a plurality of stator yokes each surrounding each of the plurality of coil bobbins in an axial direction and a radial direction of the rotating shaft, the plurality of stator yokes each having pole teeth alternately arranged in a circumferential direction around the rotating shaft and disposed opposed to a side surface of the rotor magnet;
 a first bearing supporting the rotating shaft and disposed on an output side of the stepping motor;
 a second bearing supporting the rotating shaft and disposed on an opposite side to the output side of the stepping motor;
 a magnetic member configured to attract the rotor magnet in the axial direction of the rotating shaft to a side of the second bearing;
 a first case plate fixing the first bearing;
 a second case plate fixing the second bearing;
 a washer disposed between the rotor magnet and the second bearing; and
 an output side washer disposed between the rotor magnet and the first bearing,
 wherein the first and second case plates hold the stator yoke group between both sides thereof in the axial direction,
 wherein the magnetic member has an annular shape,
 wherein a thickness TM of the magnetic member in the axial direction is less than a distance TA between a one-side end surface of the second case plate and a one-side end surface of the rotor magnet so that the magnetic member does not contact the rotor magnet,
 wherein the washer contacts the rotor magnet and the second bearing, and
 wherein the output side washer does not contact the first bearing.

8. An image pickup apparatus comprising:

a lens unit; and a stepping motor comprising:
 a rotating shaft;
 a rotor magnet fixed to the rotating shaft;
 a plurality of coil bobbins each wound with a coil;
 a stator yoke group having a plurality of stator yokes each surrounding each of the plurality of coil bobbins in an axial direction and a radial direction of the rotating shaft, the plurality of stator yokes each having pole teeth alternately arranged in a circumferential direction around the rotating shaft and disposed opposed to a side surface of the rotor magnet;
 a first bearing supporting the rotating shaft and disposed on an output side of the stepping motor;
 a second bearing supporting the rotating shaft and disposed on an opposite side to the output side of the stepping motor;
 a magnetic member configured to attract the rotor magnet in the axial direction of the rotating shaft to a side of the second bearing;
 a first case plate supporting the first bearing;
 a second case plate supporting the second bearing;
 a washer disposed between the rotor magnet and the second bearing; and
 an output side washer disposed between the rotor magnet and the first bearing,
 wherein the first and second case plates hold the stator yoke group between both sides thereof in the axial direction,
 wherein the magnetic member has an annular shape,
 wherein a thickness TM of the magnetic member in the axial direction is less than a distance TA between a one-side end surface of the second case plate and a one-side end surface of the rotor magnet so that the magnetic member does not contact the rotor magnet,
 wherein the washer contacts the rotor magnet and the second bearing, and
 wherein the output side washer does not contact the first bearing.

9. A stepping motor comprising:

a rotating shaft;

a rotor magnet fixed to the rotating shaft;

a plurality of coil bobbins each wound with a coil;

a stator yoke group having a plurality of stator yokes each surrounding each of the plurality of coil bobbins in an axial direction and a radial direction of the rotating shaft, the plurality of stator yokes each having pole teeth alternately arranged in a circumferential direction around the rotating shaft and disposed opposed to a side surface of the rotor magnet;

first and second bearings supporting the rotating shaft;

a magnetic member configured to attract the rotor magnet in the axial direction of the rotating shaft to a side of the second bearing;

a first case plate fixing the first bearing;

a second case plate fixing the second bearing; and a washer disposed between the rotor magnet and the second bearing, wherein the first and second case plates hold the stator yoke group between both sides thereof in the axial direction, wherein the magnetic member has an annular shape, wherein a thickness TM of the magnetic member in the axial direction is less than a distance TA between a one-side end surface of the second case plate and a one-side end surface of the rotor magnet so that the magnetic member does not contact the rotor magnet, wherein the washer contacts the rotor magnet and the second bearing, and wherein a spacing defined by TA-TM is less than a thickness of the washer.

10. A lens apparatus comprising:
a lens; and
a stepping motor comprising:
  a rotating shaft;
  a rotor having a rotor magnet fixed to the rotating shaft;
  a plurality of coil bobbins each wound with a coil;
  a stator yoke group having a plurality of stator yokes each surrounding each of the plurality of coil bobbins in an axial direction and a radial direction of the rotating shaft, the plurality of stator yokes each having pole teeth alternately arranged in a circumferential direction around the rotating shaft and disposed opposed to a side surface of the rotor magnet;
  first and second bearings supporting the rotating shaft;
  a magnetic member configured to attract the rotor magnet in the axial direction of the rotating shaft to a side of the second bearing;
  a first case plate fixing the first bearing;
  a second case plate fixing the second bearing; and
  a washer disposed between the rotor magnet and the second bearing,
  wherein the first and second case plates hold the stator yoke group between both sides thereof in the axial direction,
  wherein the magnetic member has an annular shape,
  wherein a thickness TM of the magnetic member in the axial direction is less than a distance TA between a one-side end surface of the second case plate and a one-side end surface of the rotor magnet so that the magnetic member does not contact the rotor magnet,
  wherein the washer contacts the rotor magnet and the second bearing, and
  wherein a spacing defined by TA-TM is less than a thickness of the washer.

11. An image pickup apparatus comprising:
a lens unit;
a stepping motor comprising:
  a rotating shaft;
  a rotor having a rotor magnet fixed to the rotating shaft;
  a plurality of coil bobbins each wound with a coil;
  a stator yoke group having a plurality of stator yokes each surrounding each of the plurality of coil bobbins in an axial direction and a radial direction of the rotating shaft, the plurality of stator yokes each having pole teeth alternately arranged in a circumferential direction around the rotating shaft and disposed opposed to a side surface of the rotor magnet;
  first and second bearings supporting the rotating shaft;
  a magnetic member configured to attract the rotor magnet in the axial direction of the rotating shaft to a side of the second bearing;
  a first case plate supporting the first bearing;
  a second case plate supporting the second bearing; and
  a washer disposed between the rotor magnet and the second bearing,
  wherein the first and second case plates hold the stator yoke group between both sides thereof in the axial direction,
  wherein the magnetic member has an annular shape,
  wherein a thickness TM of the magnetic member in the axial direction is less than a distance TA between a one-side end surface of the second case plate and a one-side end surface of the rotor magnet so that the magnetic member does not contact the rotor magnet,
  wherein the washer contacts the rotor magnet and the second bearing, and
  wherein a spacing defined by TA-TM is less than a thickness of the washer.

* * * * *